United States Patent
Mitchell

(10) Patent No.: US 8,673,442 B2
(45) Date of Patent: Mar. 18, 2014

(54) LABEL, A METHOD IN LABELLING AND USE OF AN ADHESIVE

(75) Inventor: Noel Mitchell, Wuppertal (DE)

(73) Assignee: UPM Raflatac Oy, Tampere (FI)

(*) Notice: Subject to any disclaimer, the term of this patent is extended or adjusted under 35 U.S.C. 154(b) by 408 days.

(21) Appl. No.: 12/809,182

(22) PCT Filed: Dec. 18, 2007

(86) PCT No.: PCT/FI2007/050698
§ 371 (c)(1), (2), (4) Date: Nov. 1, 2010

(87) PCT Pub. No.: WO2009/077638
PCT Pub. Date: Jun. 25, 2009

(65) Prior Publication Data
US 2011/0048632 A1    Mar. 3, 2011

(51) Int. Cl.
B32B 27/00    (2006.01)

(52) U.S. Cl.
USPC .......................................... 428/346

(58) Field of Classification Search
USPC .................... 156/272.2, 273.3; 428/355, 346; 524/589
See application file for complete search history.

(56) References Cited

U.S. PATENT DOCUMENTS

| 4,543,393 A * | 9/1985 | Blum et al. .................... 525/124 |
| 2004/0022984 A1* | 2/2004 | Abe et al. ...................... 428/40.1 |
| 2007/0014985 A1 | 1/2007 | Yuan-Huffman et al. |
| 2009/0104453 A1* | 4/2009 | Burghardt et al. .......... 428/423.3 |

FOREIGN PATENT DOCUMENTS

| CN | 1608860 A | 5/2005 |
| CN | 1799828 A | 7/2006 |
| DE | 10211585 A1 | 9/2003 |
| EP | 1479743 A1 | 11/2004 |
| WO | WO-00/34403 A | 6/2000 |
| WO | WO-2007/128789 A | 11/2007 |
| WO | WO 2007128789 A1 * | 11/2007 |

OTHER PUBLICATIONS

PCT/ISA/210—International Search Refport—Sep. 2, 2008.
PCT/ISA/237—Written Opinion of the International Searching Authority—Sep. 2, 2008.
PCT/IPEA/409—International Preliminary Report on Patentability—Jan. 20, 2010.
Translated Chinese Second Office Action—Feb. 16, 2013 (Issued in Counterpart Patent Application No. 200780102353.0).

* cited by examiner

*Primary Examiner* — Daniel McNally
(74) *Attorney, Agent, or Firm* — Venable LLP; Eric J. Franklin

(57) ABSTRACT

A label including a substrate having a face side and a rear side, and an adhesive layer arranged on the rear side of the substrate. The adhesive layer is non-tacky but activatable to become tacky. The adhesive layer includes a deactivating agent that is activatable by external energy so that the agent, when activated, begins to transform the adhesive layer to become non-tacky. A method for attaching a label to an item. The use of an adhesive in labelling.

5 Claims, 4 Drawing Sheets diisocyanate    polyol    urethane aromatic diisocyanate diphenylmethane diisocyanate (MDI)

toluylene diisocyanate (TDI)

aliphatic diisocyanate hexamethylene diisocyanate (HDI)

isophorone diisocyanate (IPDI)

polyether polyols
polypropyleneoxide polyol polyester polyols
adipic acid polyester polyol

LABEL, A METHOD IN LABELLING AND USE OF AN ADHESIVE

CROSS-REFERENCE TO RELATED APPLICATIONS

This application is the national phase under 35 U.S.C. §371 of PCT/FI2007/050698 filed 18 Dec. 2007.

FIELD OF THE INVENTION

The present invention relates to a label comprising a substrate having a face side and a rear side, and an adhesive layer arranged on the rear side of the substrate, the adhesive layer being non-tacky but activatable to become tacky. The present invention also relates to a method for attaching a label to an item and use of an adhesive in labelling.

BACKGROUND OF THE INVENTION

A number of known label decoration technologies are available and each of them possesses various advantages and disadvantages.

Self-adhesive or pressure-sensitive labels are well-known and widely used in the industry. They suffer, however, from a number of disadvantages which include the fact that the production process is rather complex. Firstly a release liner is coated on one side with a release agent, typically silicone, and then on top of this cured silicone layer, a layer of pressure-sensitive tacky adhesive is applied which remains tacky for unlimited time throughout the lifetime of the product. A paper or filmic print-carrier is then laminated to the adhesive coated release liner, at which point the adhesive is preferably transferred to the print carrier. Rolls of such a pressure-sensitive laminate are then supplied for printing the face-side and die-cutting the labels to the required shape and finally removing the waste matrix of the face side. The labels are then ready to be applied to the item to be labelled and at this point the removable liner becomes a waste product which is a major disposal issue for users of such labels and the industry at large as well as the whole environment.

Another known alternative is the use of wet-glue labels in which pre-printed and die-cut paper labels are coated with a wet-adhesive and applied to the substrate. Typically, such wet-glue label operations are very messy with a large amount of time being lost for clean-up, set-up and changing of label formats. In addition, such wet-glue labels almost always exhibit the unattractive gripper marks of the "label-box" on the finished labelled object (The label-box is a device which holds the paper labels prior to the application of the adhesive and their application to a surface.). Furthermore, wet-glue labels are not available with clear films due to the technical problem that the water cannot evaporate and escape from such labels in a completely satisfactory manner resulting in unattractive bubbles in the label.

Another decoration technology is that of shrink-sleeves, in which case the total applied cost is very high and the production process is complex. Shrink-sleeve films are normally printed on wide-web gravure or flexographic presses with solvent-based inks, which could be an environmental and safety hazard. After printing, in a separate offline process the film is formed into a tube and the seams are adhered together by the use of a solvent welding process. This tube is then cut into shorter lengths, dropped over the article to be labelled which is then fed through a shrink-tunnel at high temperature causing the film to shrink and fit the shape of the container. Although this technology has produced a number of eye-catching and appealing results for some target market segments, it has a number of disadvantages. These include the fact that by definition a shrink-sleeve covers the whole surface of the object to be labelled and therefore 180° decoration or a label covering only part of the container surface is not possible. The visibility of unattractive seams on shrink-sleeve labels is also a negative issue. It is not possible to use shrink-sleeves for containers with flat sides or with containers with handles. It is not possible to use paper labels with shrink-sleeves nor it is possible to have a variety of textures or tactile effects. It is also not possible to have spot labels, multiple labels on a container or unique label shapes when using shrink-sleeves. Neither is it possible to achieve the so-called "No-label" look with shrink-sleeves, that is, it is not possible to have the label blend with the container colour and material as if the label was not there and that the container was pre-printed.

Another widely-used label technology is that of wrap-around labels. Wrap-around labels can be produced from either paper or film and can be fed from stationary magazines or directly from reels. Typically a hot-melt adhesive is applied to the leading edge of the label which is tightly wrapped around the container being rotated at a controlled speed, with the trailing edge being fixed in place by a second narrow strip of hot-melt adhesive. The major markets for such labels are soft drinks and mineral waters due to the lack of premium look and therefore the marketing appeal of the labels. It is not possible in this case to achieve the "No-label" look. The choice of materials is very limited and design variety is restricted to that of simple cylindrical shapes.

Publication US 2007/0014985 discloses compositions having a structured morphology. When triggered or activated by a suitable action, the morphology changes, causing a corresponding predetermined change in the property of the composition. Examples range from non-tacky to tacky, from uncured to cured, including change in colour, change in intensity of presence of fragrance, odor or smell, ranging from non-reactive to reactive and from stable to non-stable. The publication discloses also non-tacky films which become tacky in consequence of heating. Such activation by heating thus results in change of the tackiness of the film, but this tackiness is preserved upon cooling and the end result is similar to a pressure sensitive adhesive that remains tacky for unlimited time.

SUMMARY OF THE INVENTION

The label according to the current invention is characterized in the adhesive layer comprises a deactivating agent which is activatable by external energy so that said agent, when activated, begins to transform the adhesive layer to become non-tacky.

This transform can take place by said agent by crosslinking the adhesive layer to form a non-tacky bond. The transform takes place over a certain period of time after which the adhesive layer has become non-tacky. The cross-linking mechanism increases the molecular weight giving to the bond strength and resistance properties.

The label according to the invention, for example, provides thus possibility to have a label that becomes tacky for a while after an activation process but then remains tacky only for a certain window of time after which the adhesive layer becomes non-tacky and forms a strong and heat-resistant bond with the surface of an item to which the label has been attached. However, the period during which the adhesive is tacky can be longer than, for example, with the traditional hot glues and that period can extend beyond the cooling period.

In addition to the above-mentioned strong and heat-resistant bond the advantages of the invention include:

One advantage is that the labelstock does not require a release liner which not only saves vital resources and manufacturing complexity but also avoids the major drawback of pressure-sensitive labels which is the disposal of the release liner after the application of the labels. In this case, there is no release liner to dispose of, nor is there any silicone involved or applied to the facestock in order to prevent blocking in the rolls, which could interfere with the subsequent printability of the facestock.

Further advantages which relate to these novel adhesives are:

It is possible to label very sensitive materials that do not tolerate hot adhesives even for a short time, labeling machines become simpler because the activation section of the adhesive may be placed further away from the section where the label is attached to a surface, and manual labeling is also possible because labels may cool down before the attachment of the labels.

A special advantage is that the adhesive can be altered from tacky to non-tacky, i.e. after the attachment of the label the adhesive changes to a non-tacky state. This happens after the label has been attached to a surface, and thus a firm joint is formed. It is difficult to remove the label from its place, and the adhesive is non-adherent.

A characteristic feature of the adhesive is that it is typically not a pressure sensitive adhesive whose degree of bonding is influenced by the amount of pressure which is used to apply the adhesive to the surface. The pressure sensitive adhesive always remains tacky during the lifetime of the product. Thus, pressure sensitive adhesives may be disclaimed in connection with the present invention.

Compared to the pressure-sensitive adhesives, the present adhesive has, for example, better bond-strength, water-resistance, solvent and heat-resistance.

The present invention deals with a label which comprises a substrate and an adhesive layer. The substrate has a face side and a rear side. The adhesive layer is situated on the rear side of the substrate. However, it is possible that this particular adhesive layer is not the closest layer of the rear side of the substrate but other layers may exist between the rear side of the substrate and the adhesive layer. Besides the adhesive, the adhesive layer may contain, for example, inert fillers. The face side may serve as a printing substrate but it is also possible that the face side remains unprinted. The substrate may consist of one layer, or it may comprise several layers which may be, for example, co-extruded or laminated layers. The substrate may be made of paper or plastic, such as polyester or polyolefin. The face side may be treated so that the surface properties become more suitable for printing. The substrate may be a plastic film which may be clear or opaque. Also "no label" look labels can be manufactured. It is possible that the substrate or at least one layer of the substrate is metallised, coloured, or textured.

The adhesive of the adhesive layer is non-tacky in its initial state, i.e. the label may be manufactured without a release liner. However, the adhesive of the adhesive layer is activatable so that it becomes tacky when external energy is exerted on the adhesive layer. The external energy may comprise, for example, heat, infra-red radiation, microwaves, or some other external energy which is capable of activating the adhesive layer.

The adhesive layer also comprises a deactivating agent, i.e. a deactivating chemical mechanism, which may be activatable by the same external energy which changes the adhesive from the non-tacky state to a tacky state. However, the external energy which changes the adhesive from the non-tacky state to the tacky state and the external energy which activates the deactivating agent may originate from diverse sources. The deactivating agent begins to function when the external energy triggers it, and starts to deactivate the adhesive layer so that it becomes non-tacky. Between the point when adhesive layer has become tacky and the point when the adhesive layer is sufficiently non-tacky again, there is a period during which the adhesive layer is adherent so that the label may be attached to another surface by the adhesive. Thus, there is a temporary period when the adhesive is adherent. The temporary period may last, for example, from 1 to 20 minutes, but the duration of the period is tailorable.

The deactivating agent may be a cross-linking agent but it is also possible that it is some other agent which is capable of changing the adherence properties of the adhesive layer from tacky to non-tacky. The deactivating agent may also be a part of a normal raw material of the adhesive—a part of the reactive groups of the raw material may be deactivated so that they do not react with other raw materials at room temperature but start to react at elevated temperatures. The adhesive which at least partially forms the adhesive layer may be, for example, a polyurethane coating comprising deactivated isocyanate groups or a separate cross-linking agent.

The deactivating agent, which may be a cross-linking mechanism, functions so that the strength and resistance properties of the bond formed by the adhesive enhance. Thus, the use of the deactivating agent results in firmer bonds. In the case of a cross-linking agent, the cross-linking agent links the polymer chains so that the molecular weight increases. The cross-linking agent may comprise deactivated reactive groups of the adhesive, or it may be a separate cross-linking agent.

The face side of the label may be printed by any type of print process such as UV-flexo, UV-letterpress, water-based-flexo, gravure, offset, screenprocess, thermal-transfer, direct-thermal hot- or cold-foil stamping. After printing, the labels may be die-cut and supplied to the application point in pre-cut form in any shape or design-format required. Alternatively, the labels may be supplied in rolls to the application point, where they could be die-cut, for example, using laser and transferred to a vacuum drum, of the type typically used for wrap-around labels, where the non-tacky dry coating on the reverse side of the facestock would be activated by heat, IR radiation or another energy source to produce a coating with sufficient "hot-tack" in order for it to be applied to the container and remain firmly in place whilst cooling.

BRIEF DESCRIPTION OF THE DRAWINGS

The label of the invention may be attached to any type of item, container or surface which may be made of, for example, plastic, glass, metal, or cardboard.

In the following, the invention will be explained by an example and by referring to the appended drawings, in which.

DETAILED DESCRIPTION OF EMBODIMENTS OF THE INVENTION

Example 1

In the following, one possibility to prepare an adhesive for an adhesive layer will be explained.

With regard to the polyurethane coating or adhesive, the use of both one-component and two-component polyurethane systems would be feasible in this case; however, one-component (IK) latent reactive polyurethane dispersions are the preferred system of choice, since they offer the advantages of a two-component system in a one-component system as the crosslinker is already incorporated in the adhesive or coating. The crosslinking mechanism will start to act when the adhesive/coating layer is activated by heating above a certain temperature, hence the term latent reactive polyurethane dispersions.

The standard two-component system requires the addition of an emulsifiable aliphatic polyisocyanate crosslinker to achieve the desired final performance level. However, the addition of the crosslinker can be an error-prone step for the user and will put limitations on the pot-life of the adhesive.

Therefore, a one-component adhesive is preferred. An adhesive based on latent reactive polyurethane dispersions crosslinks with deactivated (activatable) isocyanates and eliminates the need to handle two different components.

The one-component latent reactive polyurethane dispersions have numerous advantages, e.g.

- only one component to handle, which simplifies the logistics,
- no need for crosslinker addition before processing so there are less mistakes, and savings in cost and time,
- no limitation of pot-life, which enables a significantly extended time for use,
- the adhesive is ready to use so the adhesive is easy to use,
- the adhesive possesses excellent adhesion properties which are comparable to two-component systems.

Such latent reactive polyethane dispersions are, for example, available from Bayer Material. Science under the name of Dispercoll® U. In particular, the grade Dispercoll® U56 is a preferred product for use.

The following is a detailed explanation concerning the mentioned polyurethane adhesives.

Figure 1:
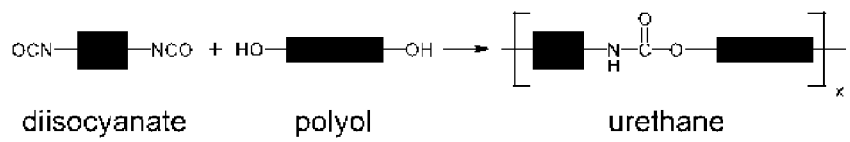
FIG. 1 shows raw materials for the production of polyurethane dispersions.
Figure 1:
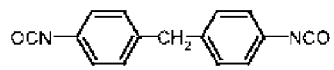
Figure 1:
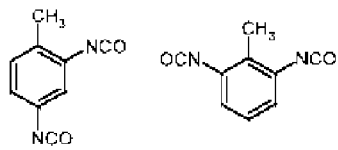
Figure 1:
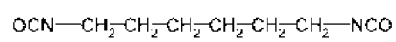
Figure 1:
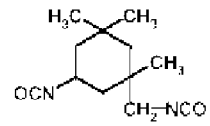
Figure 1:
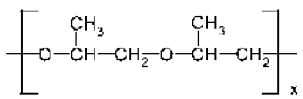
Figure 1:
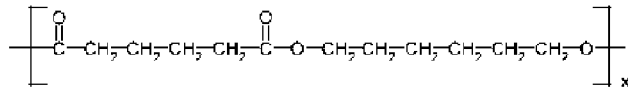

Polyurethane adhesives are generally produced by reacting long-chain polyols with aromatic or aliphatic isocyanates using the diisocyanate polyaddition process. Among the polyurethane heat-activatable adhesives, the polymer backbone is primarily based on crystalline polyester polyols, but amorphous polyester polyols have also been used for the production of heat-activatable adhesives (see FIG. 1 which shows raw materials for the production of polyurethane dispersions).

Figure 2:
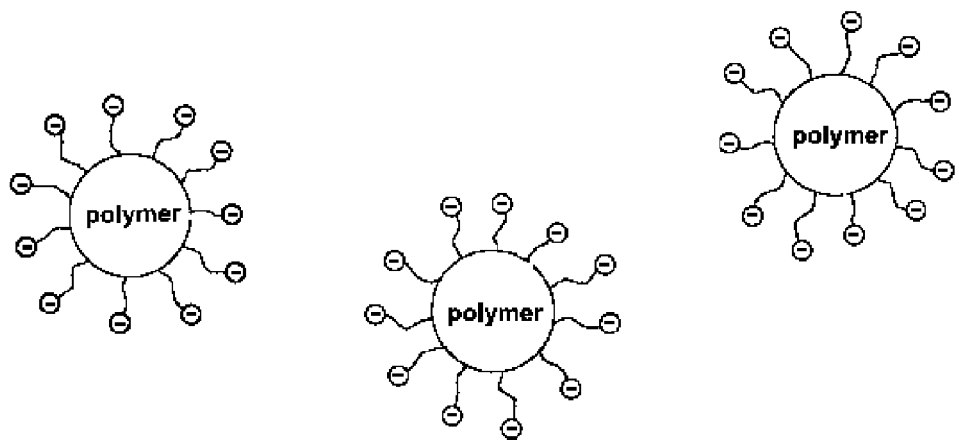
FIG. 2 shows stabilization of dispersion particles by hydrate shell which are formed due to anionic groups.

In the production of polyurethane dispersions by the acetone process or the melt-dispersion process, use is made of emulsifiers integrated in the polymer chain. Hydrophilic modification can be carried out through the covalent integration of ionic groups in the polymer chain, or through long polyether units at the ends of the chains. The dispersion particles are then surrounded by a stabilizing hydrate shell, with ionic and non-ionic hydrophilic groups generally acting synergistically (see FIG. 2).

Compared with the use of external emulsifiers, the incorporation of hydrophilic centers brings a number of advantages, such as self-dispersibility, high dispersion stability and good film-forming properties. Added to this is the fact that the covalent link prevents any diffusion of the emulsifier to the polymer surface.

Figure 3:
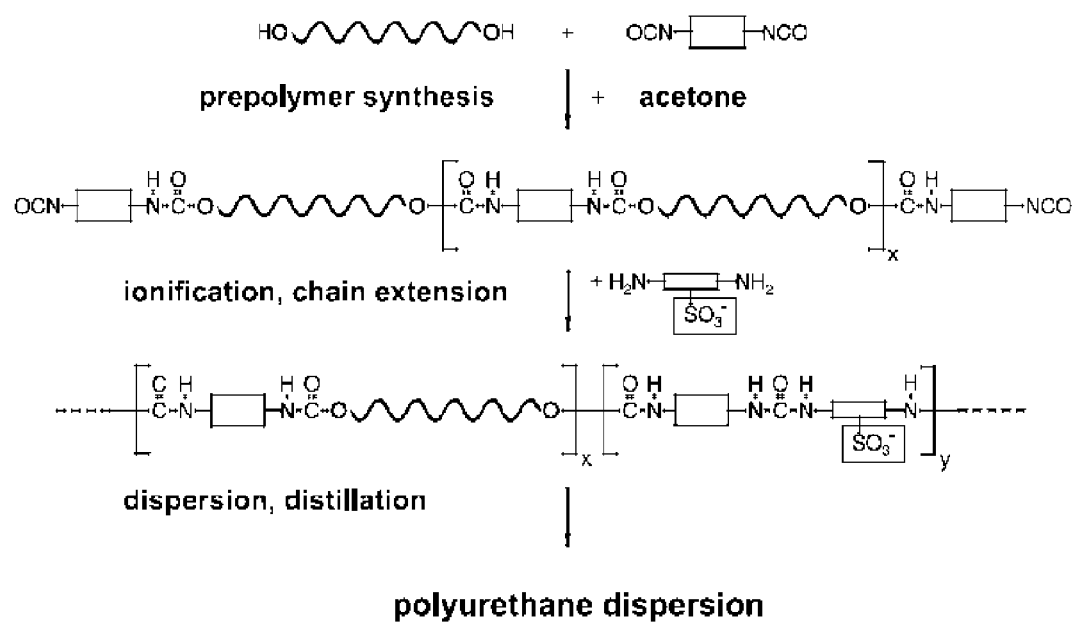
FIG. 3 shows preparation of polyurethane dispersions by using the acetone process.

With the acetone process (illustrated in FIG. 3), the first reaction stage—the so-called prepolymer-forming reaction—involves reacting the diisocyanate with the polyol in the melt to form a prepolymer terminated with isocyanate groups. In the second reaction stage—the chain extension reaction—after the addition of acetone, the molecular weight increases further through the addition of suitable chain extenders carrying ionic groups. Through the addition of water to the acetone solution, a fine dispersion is formed and, in a last stage, the acetone is distilled off. Because of the homogeneous structure of the polymer, the acetone process produces particularly high-quality dispersions.

Figure 4:
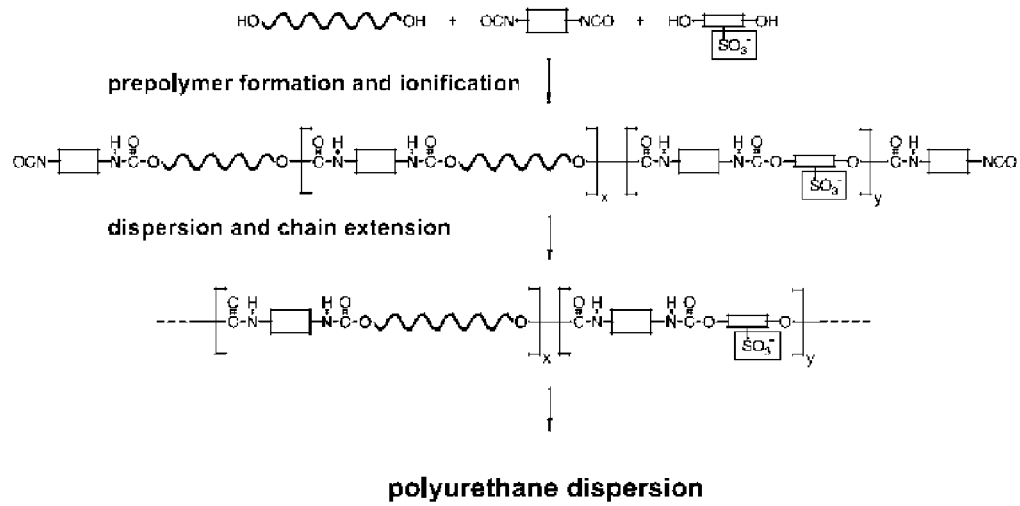
FIG. 4 shows preparation of polyurethane dispersions by using the melt dispersion process.

The melt dispersion process (illustrated in FIG. 4) has become established as a simpler alternative production procedure. In the prepolymer-forming reaction, the polyols are reacted with the diisocyanates to form an isocyanate-terminated prepolymer. Following dispersion in water, during which a fine dispersion forms spontaneously due to the internal hydrophilic character of the prepolymer, a high molecular weight polyurethane is produced by means of a short-chain diamine in the chain extension reaction.

Both processes result in dispersions with good storage life and solids contents of 40 to 50% by weight, in which the polymer is present in discrete particles of 100 to 200 nm diameter. Unlike solvent-based systems, this means that low application viscosities can also be achieved with high solids contents, and it is even possible to produce branched or crosslinked polyurethanes.

Figure 5:
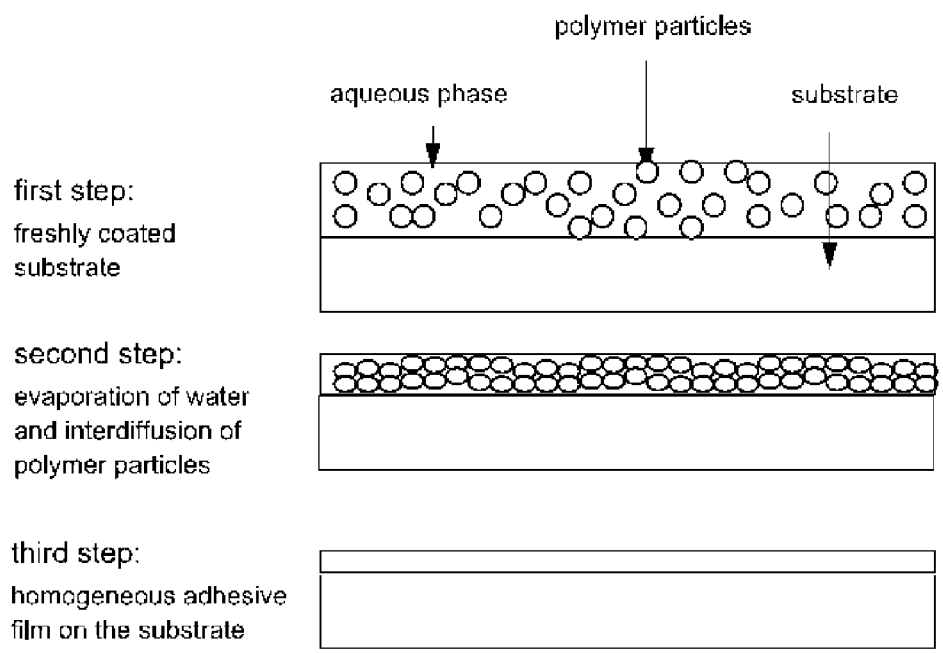
FIG. 5 shows drying and film formation of a polymer dispersion.

The dispersion produces a homogeneous adhesive film on the substrate after the water has evaporated (see FIG. 5). Although the drying process with adhesive dispersions is initially regarded as a rather problematical procedure, it is possible, with the correct choice of temperature, to achieve a drying rate for waterborne adhesives similar to that of solvent based systems.

Example 2

In the following, the drying and bonding behaviour of the adhesive of example 1 will be explained.

Figure 6:
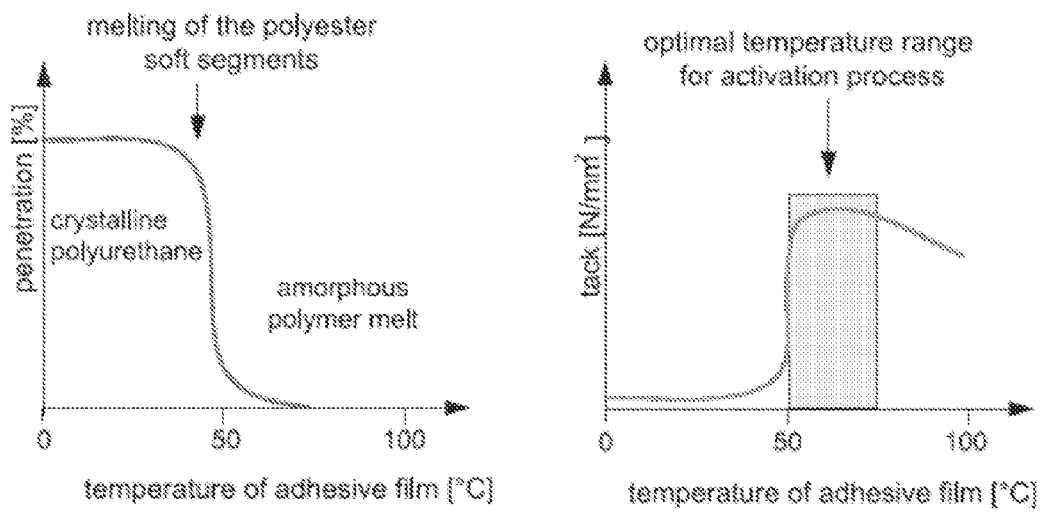
FIG. 6 shows heat activation of polyurethane adhesives with crystalline polyester soft segments measured by TMA.

The most important bonding process with polyurethane adhesives, both solvent-based and dispersion-based, is by heat activation. Adhesive dispersions based on Dispercoll® U, too, are generally processed like polyurethane solvent adhesives by heat activation. After applying the adhesive to the substrate, non-blocking films are obtained. The films only become tacky upon activation in the heat tunnel or under an infrared lamp through melting of the crystalline polyester segments at temperatures above the minimum activation temperature (see FIG. 6). The period of time during which the polymer film has sufficient tackiness for bonding is called the hot-tack life. During this time, which can range from seconds to minutes depending on the polymer structure, the substrates can be joined.

Figure 7:
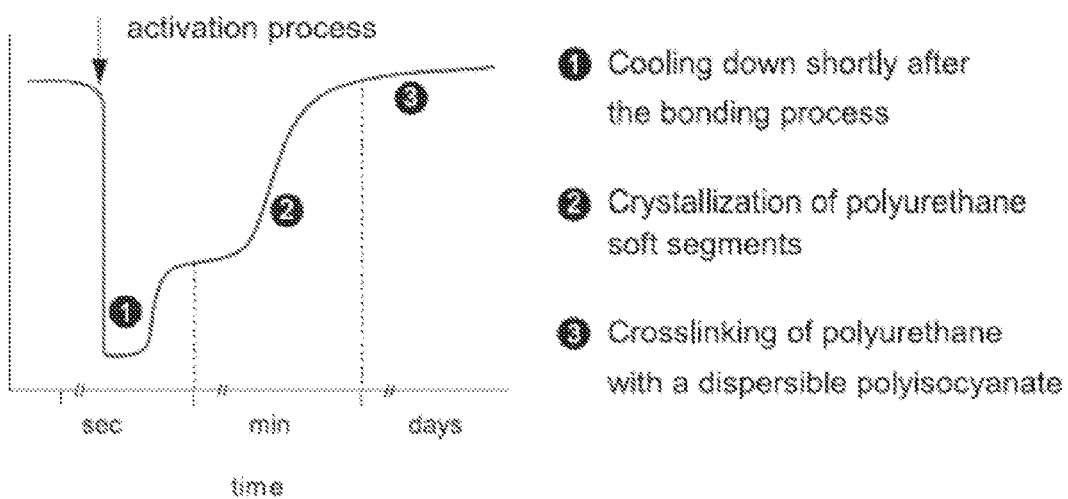
FIG. 7 shows increase of strength after heat activation bonding which occurs in 3 phases.

Through cooling of the adhesive film and crystallization of the polyester segments, a high initial bond strength is obtained after a short time, even with one-component processing. The tackiness of these systems can, so to speak, be switched on and off, enabling a highly effective production process. A further increase in strength can be achieved on many substrates through two-component processing with a dispersible polyisocyanate, in which the adhesive film is crosslinked and chemically bonded to the substrate (see FIG. 7).

Another characteristic of heat-activatable polyurethane adhesives is that, because of their high molecular weight and segmented polymer structure, the heat stability is higher than the decrystallization temperature of the polyester segments. This means the adhesives only begin to slow down the thermoplastic flow to a considerable extent at temperatures significantly higher than the minimum activation temperature.

Example 3

A labelstock according to the invention was manufactured. The reverse side of the facestock was coated with the polyurethane coating which is described in examples 1 and 2. The coating was dried at an elevated temperature. After drying, the coating was completely tack-free and non-sticky and, therefore, in comparison to pressure-sensitive labelstock, it did not require a release liner.

After coating and drying of the polyurethane coating on the facestock, the labelstock was wound into reels and then supplied to printers for further processing.

The facestock may be printed with any type of print process such as UV-flexo, UV-letterpress, water-based-flexo, gravure, offset, screenprocess, thermal-transfer, direct-thermal hot- or cold-foil stamping.

After printing, the labels may be die-cut, for example, by using laser and supplied to the application point in pre-cut form in any shape or design-format required. Alternatively, the labels may be supplied in rolls to the application point, where they could be die-cut using laser and transferred to a vacuum drum, of the type typically used for wrap-around labels, where the non-tacky dry coating on the reverse side of the facestock would be activated by heat, IR radiation or another energy source to produce a coating with sufficient "hot-tack" in order for it to be applied to the container and remain firmly in place whilst cooling. Typically, the polyurethane coating could by activated by heating it to a temperature between 50 and 80° C. for only a few seconds.

The coating will typically remain tacky for up to 15 minutes which is more than adequate for it be applied to the container after activation. After cooling, the coating is no longer tacky and forms a permanent bond to the container and displays good heat-resistance. Using this technique, any paper or filmic facestock may be chosen together with any label shape and printed by any known printing process. "No-label" look clear labels can also be achieved.

The invention claimed is:

1. An adhesive label, comprising:
   a substrate having a face side and a rear side; and
   an adhesive layer applied on the rear side of the substrate, said adhesive layer being first non-tacky but activatable by external energy from an energy source to become a tacky adhesive surface, wherein the adhesive layer comprises a segmented polyurethane structure comprising crystalline polyester segments, and wherein the adhesive layer further comprises isocyanate groups, polyisocyanate or some other agent as a deactivating agent, wherein said deactivating agent is activatable by external energy exerted on the adhesive layer from an energy source so that said deactivating agent, when activated, begins to transform the adhesive layer to become non-tacky.

2. The adhesive label according to claim 1, wherein the adhesive layer comprises a segmented polyurethane structure and a isocyanate deactivating agent, wherein said deactivating is activatable by external energy exerted on the adhesive layer from an energy source so that said deactivating agent, when activated, begins to transform the adhesive layer to become non-tacky.

3. The adhesive label according to claim 1, wherein the adhesive layer is activatable to become a tacky by external energy and the deactivating agent is deactivatable by the same external energy from the same source.

4. The adhesive label according to claim 1, wherein the adhesive layer is activatable to become tacky by external energy and the deactivating agent is deactivatable by the same external energy which originate from diverse sources.

5. The adhesive label according to claim 1, wherein the energy source provides energy in the form of heat, infra-red radiation, microwaves, or a combination of at least two of heat, infra-red radiation, microwaves.

* * * * *